United States Patent [19]

Waynant

[11] 3,991,387
[45] Nov. 9, 1976

[54] METHOD AND DEVICE FOR SYNCHRONOUS GENERATION AND AMPLIFICATION OF TUNABLE VUV LASER RADIATION

[75] Inventor: Ronald W. Waynant, Laurel, Md.

[73] Assignee: The United States of America as represented by the Secretary of the Navy, Washington, D.C.

[22] Filed: Nov. 19, 1975

[21] Appl. No.: 633,518

[52] U.S. Cl. .................. 331/94.5 L; 331/94.5 P; 330/4.3
[51] Int. Cl.² ......................................... H01S 3/20
[58] Field of Search ................ 331/94.5; 330/4.3

[56] References Cited
UNITED STATES PATENTS
3,821,664  6/1974  Godard et al. ............... 331/94.5 PE

*Primary Examiner*—William L. Sikes
*Attorney, Agent, or Firm*—R. S. Sciascia; Philip Schneider; Melvin L. Crane

[57] ABSTRACT

A device and method for synchronous generation and amplification of tunable VUV laser radiation. The system makes use of flat plate conductors which contain first and second parallel spaced channels therein. In the first channel, a $N_2$ discharge produces a $N_2$ laser pulse which excites a dye cell laser that generates a narrow radiation spectrum. Optical grating dispersion elements select two tunable frequencies which produces a colinear two laser beam output. The two beam pulse is directed into a gas or vapor cell with a resonantly enhanced third order susceptibility which mixes the two frequencies and results in a vacuum ultraviolet signal. The signal from the gas or vapor cell is transmitted by a rotatable, movable mirror vacuum optical path, with variable pulse delay, to the second channel where it is injected into the discharge in the second channel at the instant that gain is available. Triggering switches with consecutive delays are fired to produce an electromagnetic wave with a wave front at an angle with the channels with the wave traveling continuously along the length of the plates which pumps the nitrogen in the first channel and then the appropriate gases in the second channel to drive an optical pulse along the length of the second channel.

7 Claims, 1 Drawing Figure

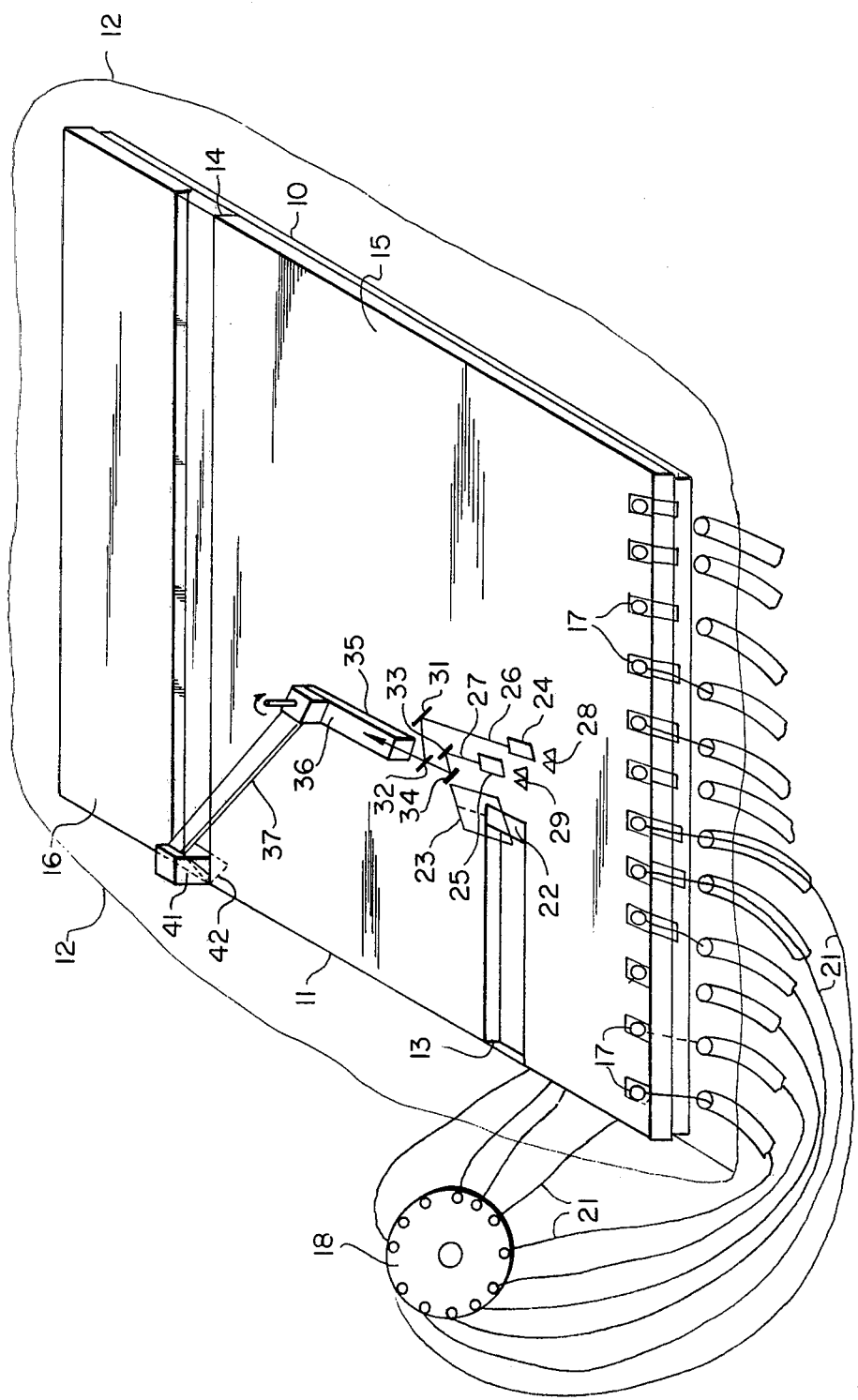

METHOD AND DEVICE FOR SYNCHRONOUS GENERATION AND AMPLIFICATION OF TUNABLE VUV LASER RADIATION

BACKGROUND OF THE INVENTION

This invention relates to laser systems, more particularly to a method and laser system for synchronous generation and amplification of tunable vacuum ultraviolet laser radiation.

Heretofore a traveling wave discharge system has been set forth in an article by John D. Shipman, Jr. in *Applied Physics Letters*, 10, Vol. 1, January 1967, pp 3–4. The teaching of this traveling wave system has been used by others to produce a traveling wave excited gas laser. Such a system has been set forth in U.S. Pat. Nos. 3,729,689 and 3,821,664, as well as in several published articles. Such as, "A Fast-Rise-Time Excitation System for Production of Vacuum Ultraviolet Laser Emission" by R. W. Waynant and J. D. Shipman, Jr., *IEEE J. Quantum Electronics*, Vol. QE7, No. 6, June 1971, p 282; and "Vacuum Ultraviolet Laser Emission from CIV," by Ronald W. Waynant, *Applied Physics Letters*, Vol. 22, No. 8, 15 April 1973, pp 419–420. Additional published articles are listed as references in the latter article. In addition, mixing of dye laser frequencies has been demonstrated by Harris and by Hodgson.

Generation of tuneable short wavelength laser pulse generally involves utilization of a laser or fast flashlamp to pump two dye lasers. These pulses are then added frequency-wise in a vapor with appropriate non-linear susceptibility and dispersion characteristics such as a strontium cell. The resulting low power pulse, which suffers due to the inefficiency of the non-linear addition process, must be amplified in order to repeat the mixing process and generate shorter wavelengths. Amplification with gas laser discharge systems cannot be accomplished because of the difficulties of synchronizing the lasers or flashlamps which excite the dye and generate the tunable pulse with the short lived gain ($\approx$1ns) of available amplifiers.

SUMMARY OF THE INVENTION

This invention includes a system which uses flat plate electrical transmission links connected in Blumlein fashion, such as set forth and described in application Ser. NO. 418,344 filed Nov. 23, 1973, now U.S. Pat. No. 3,956,711 and commonly assigned to the U.S. Government. This system uses a flat plate electrical transmission discharge system as a combination radiation generating pump (a $N_2$ laser) and a short wavelength laser amplifier. One channel generates the $N_2$ pumping laser which excites a pair of dye cells generating two tunable dye laser frequencies in the near UV. The two frequencies are made collinear and passed into a gas or vapor cell to additively produce a resultant vacuum ultraviolet signal. The vacuum ultraviolet signal is transmitted to a second channel where it is injected into the second channel simultaneous with gain in the flat plate electrical transmission system. The signal is amplified sufficiently that additional mixing can take place.

BRIEF DESCRIPTION OF THE DRAWING

The drawing illustrates a perspective view of the various elements.

DETAILED DESCRIPTION

Now, referring to the drawing, there is shown by illustration a laser-amplifier system made in accordance with the teaching of this invention. As shown the device includes a low inductance flat bottom plate 10 and an upper electrically conductive plate 11 each made of aluminum and separated by an insulation material such as a polyethlene sheet 12. The top plate is formed with a first channel 13 which extends from one edge along the length perpendicular to the edge a short distance which is partially across the width of the plate. Spaced at an appropriate distance from the first channel 13 is a second channel 14 which extends completely across the upper plate parallel with channel 13 and dividing the upper plate into two separate sections 15, 16. The channels 13 and 14 are parallel with the sides of which one side has connected a plurality of low jitter solid dielectric switches 17 each equally spaced from each other and electrically connected to the upper and lower plates such that the switches cause an electrical short between the two flat plates when the switches are electrically initiated to produce an electromagnetic wave. The switches are initiated sequentially by use of an initiating solid dielectric switch in an oil capacitor 18. The proper sequence of initiating the switches is determined by cutting the connecting cables 21 a different length so that the initiating current is delayed in accordance with the resistance and length of the conductive cables. Such an excitation system has been set forth in U.S. Pat. No. 3,864,643. The electromagnetic wave formed is at an angle relative to the length and width edges traveling from the switches across the length and width of the plates.

Channels 13 and 14 are enclosed at the ends and upper surface by suitable windows. Channel 13 includes nitrogen gas therein at a pressure of about 30 Torr and channel 14 includes a gaseous medium therein such as (hydrogen, carbon monoxide, rare gas-alkali metal mixtures). The inner end of the channel 13 is provided with a reflective surface 22 set at 45° with the axis of the channel to reflect radiation upwardly onto a second 45° angle reflective surface 23 mounted on the upper surface of plate 15 which reflects incident radiation in an axial direction of channel 13 along the upper surface of the plate. The output radiation from channel 13 is directed onto separate dye laser cells 24, 25, to generate two dye laser frequencies in the near ultraviolet. The dye laser cavities are completed by use of partially reflective mirrors 26, 27 and adjustable grating dispersion elements 28, 29. The dispersion grating elements may be adjusted in order to select desired frequencies. The output radiation from the dye laser cells are incident on optical reflectors 31–34 so positioned that the optical paths of the radiation are colinear and both outputs are directed into a gas or vapor cell 35 to produce an addition resulting in a vacuum ultraviolet signal. Since the dye laser outputs are variable by adjustment of the grating dispersion elements, the resulting VUV wavelength is also variable. The output signal from the gas or vapor cell is transmitted by a rotatable moveable mirror 36 in a vacuum optical path 37 to the channel by use of reflective surfaces 41, 42 positioned at the end of channel 14.

The optical path for the radiation output and entrance of the radiation signal at the end of channel 14 and the spacing of channel 14 from channel 13 are sufficiently variable in length that the radiation pulse arrives instantaneously with the discharge electromagnetic wave along the plates 15, 16. The flat plate transmission line system is connected in Blumlein fashion; therefore, the discharge wave formed by successive initiation of the switches is at an angle relative to the axis of the channels. Therefore the discharge wave sweeps across the channels from one end to the other. In this system, the channel 13 is a laser pulse generating pump and channel 14 functions as an amplifier of a laser pulse resulting from the laser pump pulse of channel 13.

The system has been described using two separate dye cells for producing two different laser frequencies. However, the system could be made with one dye cell for production of two simultaneous laser frequencies from the single laser cell by using orthogonal polarizations in the manner taught by U.S. Pat. No. 3,857,109, also, a publication: "Simultaneous Two-wavelength Selection in the $N_2$ Laser Pumped Dye Laser," by Herschel S. Pilloff, *Applied Physics Letters*, Vol. 21, No. 8, pp. 339–340, Oct. 15, 1972. The output of the single dye cell with a two frequency output is collinear and only one optical path is necessary for directing the two frequency pulse into the strontium cell to produce the addition resulting in a vacuum ultraviolet signal.

In operation, the transmission line and the capacitor are charged and ready for discharge through the switches. The switches are triggered successively, in order, along the width of the plate to produce a laser pumping wave. Since the switches are triggered successively, the electromagnetic wave will expand across the width and length of the plates at an angle relative to the axis of the channels in the plates. The wave travels with an unalterable velocity and without jitter. The wave excites the nitrogen gas in channel 13 to produce a radiation pulse and sweeps along the length to force the pulse from the end. The laser pulse is incident on the end reflector which reflects the radiation 90° onto the reflector placed in optical alignment therewith, which reflects the radiation onto the dye laser cells to pump the dye laser cells. The output radiation of channel 13 pumps the dye laser cells to produce an output in each cell. The gratings are adjusted such that the outputs of each dye cell are of different frequencies. The optical radiation reflectors are positioned to reflect the output pulse of the dye cells into the gas or vapor cell to add the two frequencies resulting in a vacuum ultraviolet signal. Since the output frequency of each dye cell is variable, the resulting VUV wavelength is also variable. The output pulse subsequent to addition is incident on a rotatable movable mirror in the vacuum optical path from which the radiation is directed onto a reflector surface at the end of the channel 14. The reflector at the end of channel 14 reflects the radiation onto a second reflector at the end of the channel 14 so that the radiation pulse will be directed axially within channel 14. This path length can be made variable in length to produce optical delay. Simultaneous with reflection of the radiation pulse into the end of channel 14, the electrical discharge wave across the plates travels to the channel. The radiation pulse arrives at the same instant that the electromagnetic wave reaches the channel and produces gain. Thus, the electrical wave pumps the material within channel 14 at precisely the instant that the radiation pulse arrives. Therefore, the radiation pulse is amplified as it is swept down the length of the channel. Thus, a tunable VUV laser radiation pulse may be synchronously generated and amplified.

This device permits amplification of tunable signals at frequencies far in excess of known prior art devices. This is brought about by the Blumlein generator-amplifier and results from the ability to synchronize the laser radiation pulse at the instant that gain is available at the amplifier channel.

The system has been shown with two channels of which channel 14 is an amplifier channel. Additional channels such as channel 14 may be added to provide additional stages of amplification at the same or shorter wavelengths. Furthermore the length of the amplifying channels may be increased as desired to obtain higher output power. The system may be made with additional frequency mixing cells for additional amplifier channels.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device for synchronous generation and amplification of a tunable VUV laser radiation which comprises:
    a first plate electrical conductor,
    a second plate electrical conductor positioned above said first plate,
    a thin sheet of insulation material separating said first and second plates,
    a plurality of equally spaced electrical switches secured to said first and second plates along one edge thereof,
    means for sequentially initiating an electrical discharge through each of said switches to produce a traveling electromagnetic wave across said second plate,
    first and second channels cut through said second plate conductor and extending in a direction parallel with each other and parallel with said edge to which said switches are secured,
    said first channel extending only a distance of about one third the width of said second plate conductor,
    said second channel extending across the entire width of said second plate conductor separating said second plate into two separate sections,
    at least one dye laser cell secured in optical alignment with the inner end of said first channel to receive a pumping pulse from said first channel,
    optical means for transmitting a pumping radiation pulse from said first channel to said dye laser cell for pumping said dye laser cell to produce an output of two separate frequencies in the near UV,
    a frequency adder means,
    optical means for collinearly directing said two separate frequencies into said adder to produce a vacuum ultraviolet signal,
    a vacuum optical path of variable length from said adder means to said second channel,
    optical radiation reflector means in said adder means for reflecting incident radiation therefrom through said vacuum optical path into one end of said second channel, and
    optical reflector means associated with said one end of said second channel to reflect said vacuum ultraviolet radiation into said one end of said channel.

2. A device as claimed in claim 1 wherein:
said second channel is spaced from said first channel a distance such that said electromagnetic wave reaches said one end of said second channel simultaneous with said radiation pulse from said adder means.

3. A device as claimed in claim 2 which includes:
two separate dye laser cells each of which have a different frequency output, and
adjustable optical grating dispersion elements for varying said two frequency outputs.

4. A device as claimed in claim 3; wherein,
said first channel includes a nitrogen gas therein at a pressure of 30 Torr.

5. A device as claimed in claim 4, wherein,
said frequency adder means is a gas cell, and said optical radiation reflector means in said gas cell is a movable, rotatable mirror.

6. A device as claimed in claim 5; wherein,
said gas cell is a strontium vapor cell.

7. A method for generation and amplification of tunable VUV laser radiation; which comprises,
pumping at least one dye laser cell to produce two separate output frequencies in the near ultraviolet,
directing said two output frequencies collinearly into a vapor cell to produce an addition of said two frequencies resulting in a vacuum ultraviolet signal,
exciting a gaseous medium in a laser radiation amplifier to produce gain therein.
simultaneous with producing gain in said laser radiation amplifier injecting said vacuum ultraviolet signal into one end of said laser radiation amplifier thereby amplifying said vacuum ultraviolet signal.

* * * * *